United States Patent [19]

Rasmussen et al.

[11] 4,228,324
[45] Oct. 14, 1980

[54] KEY TELEPHONE SYSTEM HAVING INTERSTATION SIGNALLING DURING HOLD CONDITION

[75] Inventors: Harry R. Rasmussen, Tacoma; Gene A. Kimzey, Puyallup, both of Wash.

[73] Assignee: Crest Industries, Inc., Puyallup, Wash.

[21] Appl. No.: 38,830

[22] Filed: May 14, 1979

[51] Int. Cl.² .............................................. H04M 1/00
[52] U.S. Cl. ............................ 179/99 H; 179/99 A; 179/84 SS
[58] Field of Search ............ 179/99, 1 H, 17 D, 17 E, 179/84 R, 84 SS, 37

[56] References Cited

U.S. PATENT DOCUMENTS

| | | | |
|---|---|---|---|
| 1,651,017 | 11/1927 | Deakin | 179/17 D |
| 3,725,600 | 4/1973 | Hutton | 179/99 H |
| 3,961,142 | 6/1976 | Caffine | 179/99 H |
| 4,011,413 | 3/1977 | Phillips | 179/99 H |
| 4,090,038 | 5/1978 | Biggs | 179/99 H |
| 4,100,375 | 7/1978 | Noller | 179/99 A |
| 4,132,860 | 1/1979 | Rasmussen | 179/99 H |
| 4,133,985 | 1/1979 | Rasmussen et al. | 179/99 R |

Primary Examiner—Gerald L. Brigance
Attorney, Agent, or Firm—Christensen, O'Connor, Johnson & Kindness

[57] ABSTRACT

In a key telephone system of the type that uses the tip and ring conductors of a telephone line to transmit a hold condition control signal between stations, interstation signal-generating and detecting circuitry are provided at first and second stations, respectively, for enabling the first station to actuate, during a hold condition on the line, an audible signalling device, such as a buzzer, located at the second station. The interstation signal is generated on command by selective actuation of a hold switch button at the first station, and is transmitted over the line as an altered hold control signal, which is detected at the second station. Upon such signal detection, a buzzer is energized alerting the second station to the presence of a held call on the line.

10 Claims, 5 Drawing Figures

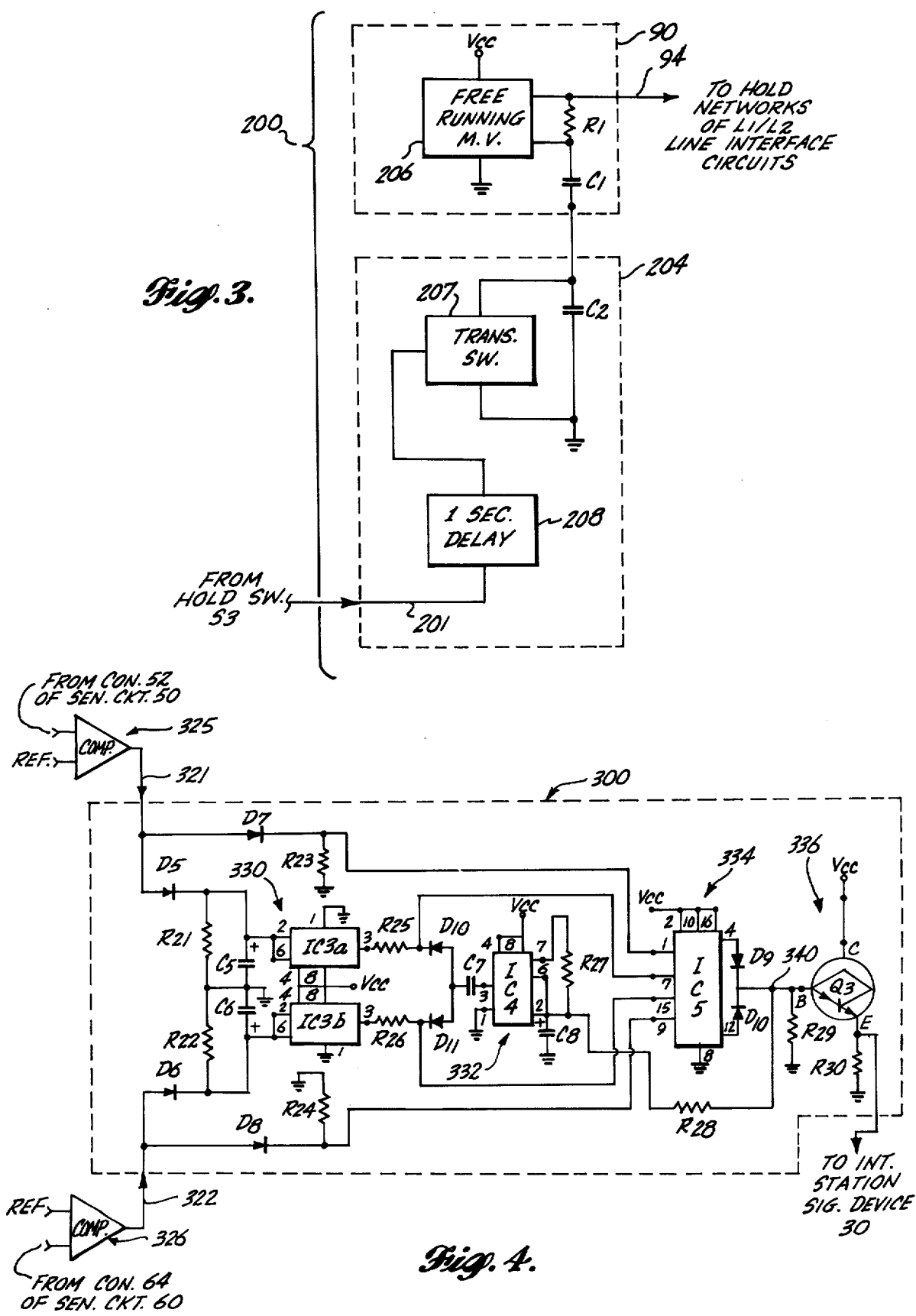

KEY TELEPHONE SYSTEM HAVING INTERSTATION SIGNALLING DURING HOLD CONDITION

BACKGROUND OF THE INVENTION

The invention pertains to key telephone systems of the type that use the tip and ring conductors of a telephone line for transmitting a hold control signal between stations.

Key telephone systems (KTS) that operate exclusively over the standard tip and ring conductors of the service phone lines available from a central office (or PBX/ESS) have a number of advantages over earlier systems that require auxiliary wiring between each KTS station. In the former, the tip and ring conductors are used for transmitting a hold condition control signal between the various KTS stations in the manner more fully disclosed in U.S. Pat. No. 4,132,860 for "HOLD CONTROL FOR KEY TELEPHONE SYSTEM" by Harry R. Rasmussen, and U.S. Pat. No. 4,133,985 for "KEY TELEPHONE SYSTEM" by Harry R. Rasmussen, Gene A. Kimzey and Robert D. Hailey. Systems such as disclosed in the above patents can be manufactured economically, and installed readily, and at a significant cost savings because of the elimination of the usual interstation, auxiliary wiring, and because of the elimination of a remotely mounted central control unit, required in the prior, standard KTS installations. A KTS using the tip and ring conductors exclusively, as disclosed in the above-mentioned patents, may be made up of a plurality of small compact control units, one for each telephone station, that may be individually mounted to the case of an associated telephone set as disclosed in U.S. Pat. No. 4,061,888 for "CONTROL UNIT MOUNTING AND INTERCONNECTING APPARATUS FOR TELEPHONE SETS" by Harry R. Rasmussen.

While KTS installations of the type disclosed in the above-mentioned patents provide a number of important advantages, such systems do not include the intercom capability that normally accompanies the prior, standard KTS equipment. In the latter case, the interstation, auxiliary wiring provides an available transmission path for intercom signals. Thus, for example, a receptionist who answers an incoming call at a first station, can place that caller on hold, and then use the intercom to alert a person at another station of the existence of a call on hold. In contrast, the KTS units that employ the tip and ring conductors as the exclusive means of transmitting interstation coordinating signals, such as the hold signal, do not have the interstation, auxiliary wiring available for intercom purposes. Thus, while busy and hold conditions may be visually indicated by line condition indicator lamps provided at each station, the absence of intercom transmission over auxiliary wiring makes it difficult for one station to alert another station to the presence of a call received or placed by the former and intended for the latter.

Accordingly, it is an object of the present invention to provide for interstation signalling, during a call on hold condition, in a KTS of the type in which all interstation coordinating signals are transmitted over the tip and ring conductors of the telephone service lines.

A more specific object is to provide in such a KTS for enabling a person at a first of the KTS stations to activate a signalling device, such as a buzzer, located at a second station so that a person at the second station can be alerted to the presence of a call on one of the available KTS lines.

Another more specific object of the invention is to provide for such interstation signalling by low cost, easily manufactured modifications to the hold control circuitry that is already available in a KTS of the characterized type.

SUMMARY OF THE INVENTION

Interstation signalling is provided in accordance with the invention in a KTS of the type having a plurality of control units, each unit being associated with one of a corresponding plurality of phone stations. In such a system each control unit, under the command of the user at the associated station, selectively connects and disconnects one or more telephone lines to a phone set at the associated station. For this purpose, each control unit has line condition sensing means and an associated indicator means for sensing and indicating line conditions of on-hook, off-hook and hold. For the hold condition, each unit incorporates a hold control switching network and an associated hold signal generator for selectively applying a hold control signal to the tip and ring conductors of a selected line, in response to a button-operated hold switch. Operation of the hold switch places a holding impedance across the line to maintain the central office (or PBX/ESS) connection, applies a hold control signal to the line, and disconnects the line from the station set.

In the above-characterized type of KTS, the improvement according to the invention incorporates in a first of the control units, an interstation signal-generating circuit for altering the hold control signal to produce an altered hold signal that is communicated to a second station over the tip and ring conductors of the telephone line. At the control unit associated with a second station, signal detection circuitry is provided for detecting the altered hold signal. Also located at the second station is an interstation signalling device, such as a bell or buzzer, which is energized by the detection circuitry. Because the interstation signal may be used to trigger a bell or buzzer in a manner akin to a central office ringing signal, it is sometimes called a rering or ringback signal.

In the preferred form of the invention, the interstation signal generation circuitry includes a circuit for changing the frequency of the hold control signal such that the altered signal continues to provide the hold control function, and the changed frequency rate is detected by the interstation signal detection circuitry for operating the signalling device at the second station. Additionally, in this preferred form of the invention, the circuitry for altering the hold control signal is responsive to a predetermined mode of operation of the same hold switch that initiates the normal hold condition.

These and further features, objects and advantages of the invention will become apparent to those skilled in the art from the following detailed description and appended drawings.

BRIEF DESCRIPTION OF THE DRAWINGS

FIG. 3 is a composite block and schematic diagram of the interstation signal-generating circuit and the associated hold control signal generator that is provided in the control unit shown in FIG. 2.

FIG. 4 is a composite block and schematic diagram of the interstation signal detection and control circuitry that is provided in the control unit shown in FIG. 2.

DETAILED DESCRIPTION

Figure 1:
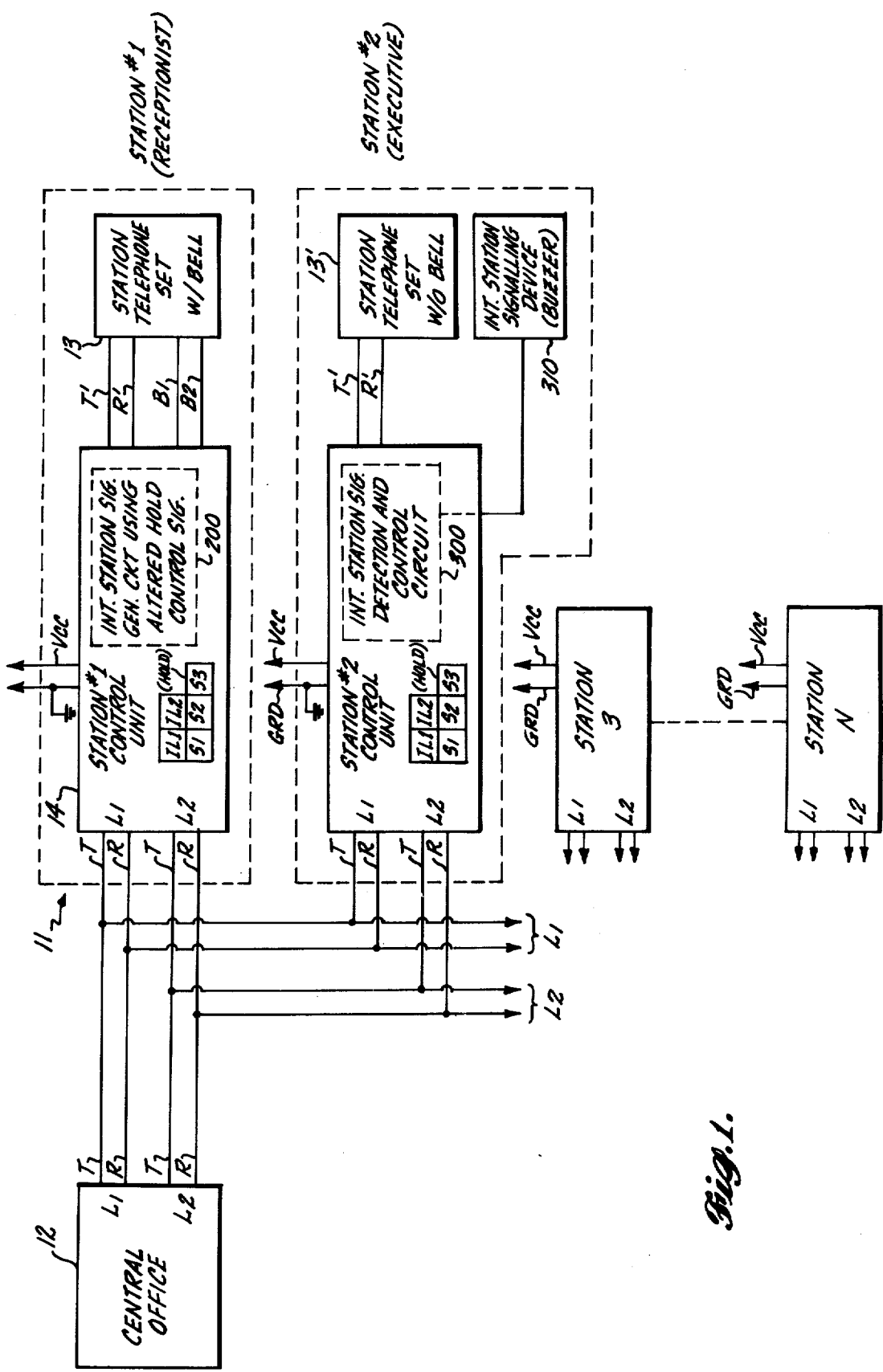
FIG. 1 is a generalized block diagram of a key telephone system incorporating the interstation signalling feature of the present invention.

With reference to FIG. 1, a key telephone system (KTS) 11 is illustrated in conjunction with first and second telephone lines L1 and L2 extending from a central office 12 (which may also be a private branch exchange—PBX, or an electronic switching system—ESS). At each of a plurality of phone stations #1, 2, 3 ... N, KTS 11 provides a control unit such as illustrated by unit 14 at station #1 and unit 14' at station #2 for selectively connecting lines L1 and L2 to the station phone sets 13 and 13', respectively. Control units 14 and 14' are of the type described in the above-mentioned U.S. Pat. Nos. 4,132,860 and 4,133,985, the disclosures of which are incorporated herein by reference. As described therein, such control units coordinate the operation of the various KTS station #1-N, by means of signals, including a hold control signal, that are transmitted exclusively over the tip and ring conductors of lines L1 and L2.

In accordance with the disclosed embodiment of the present invention, the control unit for at least one of the stations incorporates a signal-generating circuit 200, provided in this instance in control unit 14 of station #1, for transmitting, on command, an interstation rering (or ringback) signal that is received by one or more of the other stations. For this purpose, the control unit 14' at station #2 is provided with an interstation signal detection and control circuit 300 which, in response to receipt of the interstation signal generated by circuit 200 at station #1, energizes an interstation signalling device 310, such as a bell, buzzer or other visual/aural indicator. As described more fully herein, the interstation signal is generated, at the command of station #1, during a hold condition on one or both of lines L1 and L2 and is produced by modifying or altering a characteristic of the normal hold control signal. In the presently preferred embodiment, as disclosed herein, the hold control signal is altered by changing the hold flash rate from one frequency to another. As such, the altered hold control signal serves two functions. First, the signal continues to act as a control signal for disposing the various control units 14, 14' in a line holding condition. Secondly, the altered frequency of the signal is detected by circuit 300 in unit 14', which in turn activates signalling device 310 at station #2.

As an example of one use of the invention, KTS 11 may be installed in a business office in which station #1, equipped with control unit 14 and interstation signal-generating circuit 200, is located at the receptionist's desk. The associated telephone set 13 at station #1 will be provided with the usual bell so that the receptionist's phone rings in response to an incoming call on either of lines L1 or L2. Station #2 will be located in an executive's office. That station, equipped with control unit 14', includes the detection and control circuit 300 for responding to the interstation signal and hence for energizing bell or buzzer device 310. In such case, the standard ringing bell in the executive's telephone set 13' at station #2 may be disabled or removed so that central office originated ringing signals associated with incoming calls do not ring set 13' and thus do not disturb the executive at station #2. Alternatively, the standard bell in set 13' may be disconnected from the standard bell ringing leads, and reconnected as the interstation signalling device 310.

Incoming ringing signals are thus received at station #1 and applied to the bell of telephone set 13. The receptionist at station #1 answers the phone, and if it is to be directed to the executive, the caller is placed on hold by pressing the button-operated hold switch S3 of unit 14. Additionally, and as described more fully hereinafter, hold switch S3 is operated in a predetermined manner, such as by continuing to depress switch S3 for a certain time interval, to thereby cause signal-generating circuit 200 to produce the interstation signal in the form of an altered condition of the hold control signal. The line continues to be held and the altered signal condition is detected by circuit 300 at station #2 and device 310 is operated, sounding a buzzer in the executive's office. The executive is thus alerted, by the buzzer, that a call is waiting on L1 or L2. The proper line will be indicated by a hold flashing condition on the corresponding line condition indicating lamp IL1 or IL2. Similarly, the receptionist at station #1 may place a call for the executive on line L1 or L2, and after receiving the called party place the line in a hold condition and then continue to depress hold switch S3 to signal the executive via circuit 300 and device 310 that the called party is waiting on the held line.

Figure 2:
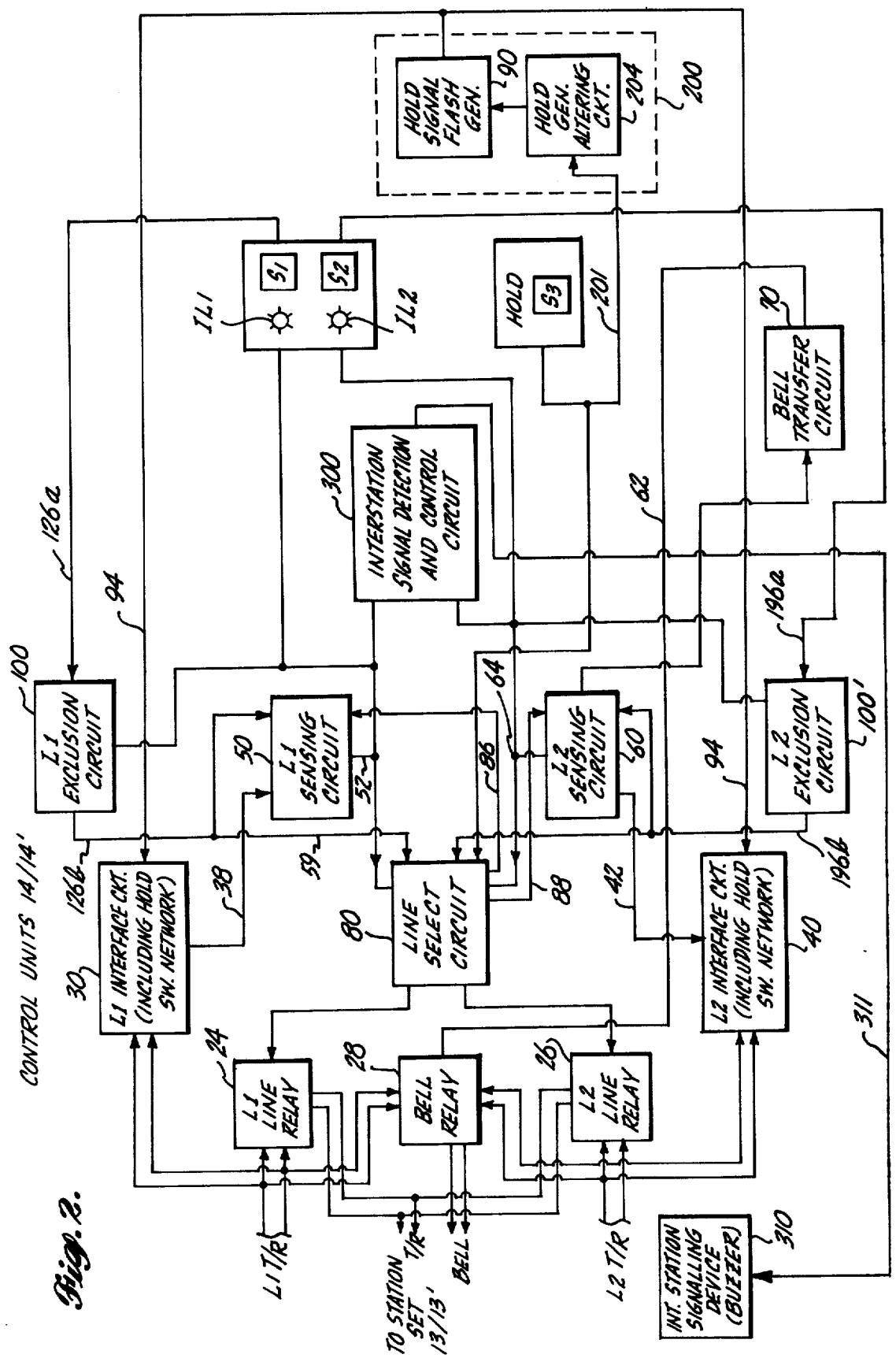
FIG. 2 is a more detailed block diagram of one of the plurality of control units that is provided in the key telephone system illustrated in FIG. 1.

With reference to FIG. 2, a more detailed block diagram is shown for each of control units 14 and 14'. For manufacturing purposes, the control units for each of stations #1-N, may be identical and include all of the components that are depicted in the FIG. 2 diagram of control units 14/14'. Then, during the installation of KTS 11 each control unit may be programmed, such as by using jumper wires or built-in switches, to selectively enable and disable certain components of the standard manufactured unit. Thus, the unit depicted in FIG. 2, when used as control unit 14 for station #1 as shown in FIG. 1, would be set up so as to enable the interstation signal-generating circuit 200 and disable the output of the detection and control circuit 300. More typically, the interstation signalling device 310 will merely be omitted such that the output 311 from circuit 300 is deadended. Conversely, when the standard unit illustrated in FIG. 2 is used for control until 14 at station #1 in FIG. 1, circuit 300 would be operative and output 311 therefrom would be connected to device 310, and the signal-generating circuit 200 would be disabled by breaking connection 201 from the hold switch S3. Alternatively, both stations #1 and #2 may be equipped with both interstation signal-generating and detecting circuits 200, 300 and associated signalling devices 310, for two-way signalling.

Thus, the interstation signalling feature of the present invention may be tailored to each particular KTS installation, while permitting the manufacture of a standardized control unit. Additionally, and as fully described in the above-mentioned U.S. patents, each standard control unit 14/14' includes L1 and L2 line relays 24 and 26 for selectively connecting the tip and ring conductors of either one or both of lines L1 and L2 to the station set 13/13'; and a bell transfer relay 28 for transferring ringing signals appearing on either of lines L1 or L2 to common output ring lines B1, B2 that are connected to the bell or other signalling device at the associated station. As mentioned above, the bell for station set 13' shown in FIG. 1 may be disabled and this may be accomplished by simply not connecting the common ring lines from bell relay 28 as shown in FIG. 2 to the bell in set 13' of FIG. 1.

As also described in the above-mentioned U.S. patents, control units 14/14' include a line interface circuit 30, a sensing circuit 50, a line condition indicating lamp IL1 and a line selector switch S1 which are associated with line L1. These components cofunction with the L1 exclusion circuit 100 which is fully disclosed in copending U.S. application Ser. No. 007,202, filed Jan. 29, 1979, for KEY TELEPHONE SYSTEM HAVING AUTOMATIC EXCLUSION CIRCUIT FOR LINE PRIVACY by Harry R. Rasmussen and Gene A. Kimzey, the disclosure of which is incorporated herein by reference. Similarly, an interface circuit 40, a sensing circuit 60, a line condition lamp IL2 and a line selector S2 are associated with telephone line L2, and cofunction with an L2 exclusion circuit 100' that is also disclosed in the above-mentioned copending application Ser. No. 007,202. Common to both lines L1 and L2 is a line selector circuit 80 which, as described in the above-mentioned U.S. patents, provides for coordinating the operation of line relays 24 and 26 in response to sensing circuits 50 and 60 and line selector switches S1 and S2. Hold switch S3, as mentioned above, serves to selectively place one or the other of lines L1 and L2 in a hold condition, and associated therewith is a hold signal flash generator 90 that in the presently disclosed embodiment of the invention serves the dual functions of acting as a fluctuating hold control signal in the manner described in the above-mentioned U.S. patents, and in connection with the present invention, of acting together with a hold generator altering circuit 204 to form the interstation signal-generating circuit 200 that doubles the normal hold signal flash rate. As described more fully hereinafter, the output of hold signal flash generator 90, whether at its normal signal rate, or at the double rate produced during the interstation signalling, is visually displayed by a flashing condition on one or both of the indicator lamps IL1 and IL2 located adjacent the line pickup switches S1 and S2, respectively.

As fully described in the above-mentioned U.S. patents, line interface circuits 30 and 40 are respectively connected to lines L1 and L2 and include electrical isolation components that enable signal information to be coupled between each of the telephone lines and the associated line condition sensing and hold signal-generating circuitry of units 14/14' without adversely affecting the operation of the overall telephone system, including the cooperation of the lines with central office 12 (FIG. 1). Sensing circuits 50 and 60 are respectively connected to interface circuits 30 and 40 by means of connections 38 and 42, and serve to detect the operating conditions on lines L1 and L2: namely, whether the condition is on-hook (idle), off-hook (busy), holding or ringing. Indicator lamps IL1 and IL2, connected to sensing circuits 50 and 60 by means of connections 52 and 64, respectively, display the instantaneous operating conditions of the associated lines. Line selector circuit 80 is responsive to signals from sensing circuits 50 and 60 received over connections 52 and 64, respectively, for controlling the operating states of the line relays 24 and 26. Additionally, line selector circuit 80 acting in response to to hold switch S3 develops hold initiating signals which are applied via connections 86 and 88 to hold control circuitry provided within sensing circuits 50 and 60 respectively, for placing one or both of the lines in a hold condition. The hold condition for each line is actually effected by hold bridge networks provided in line interface circuits 30 and 40, which include the contacts of hold relays that are selectively energized by sensing circuits 50 and 60. Connections 59 and 61 between circuit 80 and L1 and L2 sensing circuits 50 and 60, respectively, ensure that when hold switch S3 is actuated, only that telephone line then connected to the associated station set by either relay 24 or relay 26 will be placed in a hold condition. Line selector circuit 80 also provides an automatic disconnect feature, and enables each station to establish a conference call jointly with the two or more lines available at the station. The automatic disconnect occurs when one of the incoming lines is connected to the station set, and the selector switch associated with the other line is actuated, causing the first-mentioned line to be automatically "dumped", i.e., disconnected from the single station set. The conference call is effected by simultaneously actuating both selector switches so as to override the automatic disconnect operation, and cause both line relays 24 and 26 to operate and thus concurrently connect both incoming lines to the station set.

With reference to FIGS. 2 and 3, the interstation signal-generating circuit 200 in this disclosed embodiment uses the existing hold signal flash generator 90 that forms part of the hold control subsystem disclosed in the above-mentioned U.S. patents, and adds thereto a circuit 204 for modifying the flash rate of the hold control signal produced by generator 90. Circuit 204 is normally in a quiescent mode having no effect on the operation of generator 90, and is triggered to an active state for altering generator 90 in response to a predetermined mode of operation of the hold select switch S3, communicated to circuit 204 over connection 201.

More particularly, as shown in FIG. 3, generator 90 of circuit 200 may be provided by a free-running multivibrator 206 and an associated R/C time constant network formed by R1 and C1 which determines the operating period of multivibrator 206, and thus also determines the frequency of the hold control signal or flash rate produced at the generator's output 94.

Circuit 204 includes an additional capacitor C2, a transistor switch 207 and a signal delay 208. Capacitor C2 is connected to ground in a series path with capacitor C1 of generator 90. Transistor switch 207 is connected in shunt with capacitor C2 so that, depending upon the state of switch 207, capacitor C2 is either in circuit with capacitor C1 and resistor R1, thus influencing the output frequency of generator 90, or capacitor C2 is shunted by switch 207 so that capacitor C1 is, in effect, connected to ground, bypassing capacitor C2. As more fully described hereinafter, switch 207 is normally in a low impedance state, shorting out capacitor C2 and thus providing the quiescent mode of circuit 204, during which the output frequency of generator 90 is determined by R1/C1. When switched to the high impedance state, transistor switch 207 is effectively removed from the circuit, establishing an R/C delay network for generator 90 based on the combined serial capacitance of capacitors C1 and C2, thus altering the output frequency of the hold flash signal.

Transistor switch 207 is switched between its high and low impedance conditions by a delayed response to a hold command signal received from hold switch S3 via connection 201. The insertion of delay 208 in series between hold select switch S3 and transistor switch 207 establishes two different operating modes in response to hold switch S3. In a first mode, hold switch S3, which is a momentary contact switch, can be depressed to immediately initiate a standard hold condition, and quickly released before delay 208 communicates the operation of the hold switch to transistor switch 207. In a second mode, which is effective to produce the interstation signal, hold switch S3 is depressed for at least the delay interval provided by delay 208. In such case, delay 208 responds to the sustained change in the signal condition on connection 201 and switches transistor switch 207 from the low to high impedance condition and thereby alters the output frequency of generator 90. In this example, a one second interval is provided for delay 208, although other delay periods can be effectively used if desired.

With reference to FIG. 4, the interstation signal detection and control circuit 300 is a composite of detection and control circuitry for each of the available lines L1 and L2. Circuit 300 provides a common output control signal over output line 311 for operating signalling device 310 (FIG. 2) irrespective of the particular telephone line over which the interstation signal is received. Thus, circuit 300 includes first and second inputs 321 and 322, respectively, which receive line condition signals as sensed by circuits 50 and 60, respectively (FIG. 2). These line condition signals, representing on-hook, off-hook, holding and ringing, are communicated to circuit 300 through buffers provided by comparator circuits 325 and 326. In particular, comparator 325 receives at a first of its inputs, the output line condition signal from connection 52 of sensor circuit 50, and compares the line condition signal with an intermediate reference signal so that the output of comparator 325 switches, in a positive fashion, either high or low, as a function of variations in the output signal from sensing circuit 50. In this embodiment, when line L1 is idle, the output of comparator 325 applies a logic high to the input 321 of circuit 300. During a busy condition on L1, the output of comparator 325 follows the line condition and switches low, applying a logic low signal to input 321. During a ringing condition, input 321 swings to a logic low during the ring, and reverts to a logic high during the silent interval between rings. When L1 is on hold, comparator 325 causes input 321 to fluctuate high and low at the hold flash rate. Comparator 325 does not follow the ringing frequency or the dialing pulses, as these signals are filtered out by sensing circuit 50 as described in the above-mentioned U.S. patents.

Similarly, comparator 326 is responsive to the L2 line condition as sensed by sensing circuit 60 and develops and applies high and low logic signals to input 322 in the same manner as described above for comparator 325 and input 321.

In general, interstation signal detection and control circuit 300 is a composite of detection circuitry for both lines L1 and L2, and has a common output control circuit for operating the interstation signalling device 310. More specifically, the circuitry includes a composite frequency discrimination circuit 330 for discriminating between the normal hold flash rate, and the altered hold flash rate that exists during interstation signalling; a power-up reset circuit 332 that resets the components of circuit 300 to a properly synchronized initial condition during power up; a dual binary coded decimal (BCD) counter circuit 334 for accumulating hold flash pulses at the altered flash rate during interstation signalling; and a common output control switching circuit 336 for operating device 310.

Discrimination circuit 330 includes a pair of integrated circuit timers IC3a and IC3b. These timers cooperate with first and second diode-controlled R/C delay networks formed by D5, R21, C5 and D6, R22, C6, respectively, for discriminating between the frequency of the normal hold control signal and the altered frequency of the hold signal that characterized the presence of the interstation signal.

For this purpose, diode D5 is poled so as to pass positive current from input 321 to a parallel connection of resistor R21 and capacitor C5 to ground. The non-grounded side of the parallel R/C network is connected to input pins 2 and 6 of IC3a so as to control the voltage state of timer IC3a at its output pin 3. Thus, depending upon the frequency of a fluctuating signal applied to the anode of diode D5, the R/C network provided by R21 and C5 will develop a high or low voltage condition at input pins 2 and 6 of timer IC3a, causing its output at pin 3 to switch accordingly. In this instance, the values of R21 and C5 are selected so that during the normal hold condition, with input 321 switching high and low at the normal hold flash rate (e.g., 1 Hz) capacitor C5 is allowed to discharge sufficiently through R21 during each low-going swing, so that inputs pins 2 and 6 of timer IC3a are held below the switching threshold of IC3a. During such condition, timer IC3a is reset and output pin 3 switched to a logic high.

Conversely, at the higher frequency (e.g., 2 Hz) of the altered hold control signal existing during interstation signalling, the time constant of R21 and C5 (e.g., 1.3 Hz) is such that input pins 2 and 6 are driven above the switching threshold of timer IC3a, so that it is disposed in the set state and output pin 3 goes to a logic low.

The lower half of the discrimination circuit 330 associated with line L2 and including D6, R22, C6 and IC3b functions in the identical manner to control an output pin 3 of IC3b in response to the frequency of the hold signal on L2.

An output or current limiting resistor R25 is connected between pin 3 of IC3a and a reset/enable input of a first half of dual counter circuit 334. Similarly, resistor R26 connects the output pin 3 of timer IC3b to the other reset/enable input of dual counter circuit 334.

In this instance, timer IC3a (and identical timer IC3b) are provided by multipurpose integrated timer circuits commonly designated in the electronics industry as 555 timers. Details of the construction and operation of a 555 timer are available from the various companies that manufacture the device, including National Semiconductor Corporation of Santa Clara, California and Ratheon Corporation of Boston, Massachusetts. Also, the operating characteristics of a 555 timer are summarized in the aforementioned U.S. patents.

While called timer circuits, IC3a and IC3b are multipurpose control circuits that can be adapted for performing a variety of timing and control functions, depending upon the external circuitry to which they are connected. In the present case, the connection of the input pins 2 and 6 of each of these timers to an R/C delay network, causes the so-called timer circuits to function as threshold switches as described above. For the purpose of understanding the present invention, only a brief discussion is needed of the switching characteristics of a 555 timer. Thus, with reference to IC3a, that timer has a set state and a reset state. In the set state, the output at pin 3 is low (at or near ground potential). To place it in the set state, input pins 2 and 6 are driven to above $+\frac{2}{3}$ Vcc. In the reset state, output pin 3 is high. It is switched to the reset state by causing the voltage and input pins 2 and 6 to decrease from above $+\frac{2}{3}$ Vcc to below $+\frac{1}{3}$ Vcc. The supply voltage for the timer is connected across pins 8 and 1, and an additional input pin 4, which provides an enable/inhibit control in other circuitry, is also connected to the supply voltage to dispose the timer in a continuously enabled state. In practice, timers IC3a and IC3b may be packaged together as a dual timer unit known as a 556 timer.

Power-up reset circuit 332 includes another integrated circuit timer IC4 which, as in the case of integrated circuits IC3a and IC3b, may be provided by a standard 555 timer. Input pins 2 and 6 of timer IC4 are connected via a resistor R28 to a common output junction of counter circuit 334, and to ground via a capacitor C8. A first output pin 3 of timer IC4 is connected through a capacitor C7 to a joint connection with the anodes of diodes D10 and D11. The cathodes of diodes D10 and D11 are individually connected to the output resistors R25 and R26 of discrimination circuitry 330, which are in turn individually connected to the reset-/enable inputs of counter circuit 334 as described above. An auxiliary output pin 7, which is associated with an open collector of an emitter grounded transistor within timer IC4 is connected back to the input at pins 2 and 6 of the timer via resistor R27. As described below in connection with the operation of counter circuit 334, these components of power-up reset circuit 332 function to ensure proper switching synchronization when the control unit is initially powered up, and to ensure such synchronization during the first counting cycle of counter circuit 334 in response to the altered frequency of the hold control signal.

Counter circuit 334 includes an integrated dual BCD counter IC5 incorporating first and second functionally separate BCD counters in a single package. A first counter is associated with line L1 and has a count input pin 1, a reset/enable pin 7 and an output pin 4. Similarly, the other counter half of IC5 is associated with line L2 and has a count input pin 9, a reset/enable pin 15 and an output pin 12. Supply voltage +Vcc is connected to pins 2, 10 and 16 and pin 8 is grounded. Output pins 4 and 12 are connected through diodes D9 and D10 to a common output junction 340.

Count input pin 1 associated with the line L1 portion of counter IC5 is connected via diode D7 and a shunt-to-ground pull-down resistor R23 for receiving a series of pulses applied at input 321 as comparator 325 fluctuates high and low in response to the hold control signal, either at the normal or altered flash rate. Similarly, count input pin 9 of the portion of timer IC5 associated with L2 is connected to receive a series of pulses associated with either the normal or altered hold control signal via a diode D8 and a pull-down resistor R24.

In this embodiment, both halves of counter IC5 are conditioned so that upon reaching a count of 2, the associated counter output, pins 4 or 12, switches to a logic high. And when a count of 4 is reached, the associated output pin 4 or 12 switches back to a logic low. Furthermore, the counting of the pulses applied at input pins 1 and 9 can only occur when the reset/enable inputs at pins 7 and 15 are at a logic low, which as mentioned above is controlled by the output states of timers IC3a and IC3b, respectively. As described more fully below the above-described operating conditions of circuits 330, 332 and 334 cause common output junction 340 to swing to a logic high for brief intervals only when one or the other of inputs 321 and 322 has received the altered and, in this instance, higher flash rate frequency produced by generator circuit 200 (FIG. 3).

Output switching circuit 336 incorporates a Darlington pair transistor switch Q3 connected in an emitter follower configuration to drive the interstation signalling device 310. For this purpose, the base electrode B is connected to the common output junction 340 of counter circuit 334. Pull-down resistor R29 is connected from base B to ground so as to normally hold Q3 off, maintaining a high impedance condition between collector C and emitter E and thus maintaining a low voltage drop across the emitter resistor R30. When output junction 340 momentarily swings high, under the operating conditions discussed above, transistor Q3 is switched on, thus providing a low impedance path between supply voltage +Vcc and resistor R30, so as to increase the voltage drop across R30 for driving device 310.

Operation

Referring again to FIG. 1, it will be assumed that an incoming call on line L1 is to be received by a receptionist at station #1. The ringing signal associated with the incoming call is detected by control unit 14 and causes a ringing signal to be applied to the bell of station set 13 via bell control leads B1 and B2. The same ringing signal is applied to the L1 input at control unit 14' of station #2, but the bell for the associated telephone set 13' has been disabled or not connected and thus no audible ring or tone is heard. A visual indication of the incoming call is, however, displayed on IL1 of both units 14 and 14'.

The receptionist at station #1 answers the call by operating the line L1 pickup switch S1 and by lifting the hand set of telephone set 13. If the call is intended for the executive at station #2, the receptionist will depress the hold select switch S3 on unit 14 at station #1 and will continue to depress the hold switch S3 for a predetermined delay interval. This accomplishes two functions. First, immediately upon operation of hold switch S3, unit 14 places a holding impedance across line L1, disconnects the station set 13 from line L1 and generates a hold control signal at the standard 1 Hertz rate. The holding impedance maintains the central office connection over line L1 with the remote caller, even though all the telephone sets associated with KTS 11, including set 13, have been placed on-hook. The hold control signal is communicated to each of the other stations, including station #2 and causes the associated line lamp IL1 at each control unit to flash at the 1 Hertz rate.

By maintaining the hold select switch S3 in a depressed condition for the delay interval of one second, the receptionist at station #1 commands circuit 200 of control unit 14 to generate the interstation signal. Thus, with reference to FIG. 3, after hold switch S3 has been depressed for one second or more, delay 208 operates transistor switch 207 to cause the hold signal generator 90 to produce the higher frequency hold control or flash signal at output 94.

At control unit 14' of station #2, the line L1 portion of detection and control circuit 300, as illustrated in FIG. 4, responds to the higher frequency flash rate, causing timer IC3a to assume a set state of logic low at output pin 3, which is communicated via resistor R25 to reset/count enable pin 7 of counter IC5 of circuit 334. With pin 7 of IC5 at a logic low, count input pin 1 of IC5 is responsive to the higher frequency pulse rate communicated via diode D7 from the line L1 input 321. It is observed at this point that if the hold control signal produced by generator 90 at output 94 (FIG. 3) was at the lower and normal 1 Hertz rate, the R/C network of resistor 21 and capacitor C5 associated with timer IC3a would have caused the voltage at input pins 2 and 6 of IC3a to rise high enough to reset output pin 3 to a logic high. A high at pin 3, when applied through resistor R25 to pin 7 of counter IC5, would have disabled the line L1 portion of counter IC5, preventing it from advancing in counting state in response to the 1 Hz hold control pulses.

However, with pin 7 of IC5 enabled by the low level output at pin 3 of IC3a, counter IC5 counts the 2 Hz hold signal pulses and, upon reaching a count of 2, causes output pin 4 to switch high, which in turn drives output junction 340 to a logic high, swamping pull-down resistor R29 and turning on transistor switch Q3 of output switching circuit 336. The buzzer signalling device 310 at station #2 is energized, and the executive at station #2 is thus informed that a call is waiting on one of the available lines. The executive looks at control unit 14' and sees that the L1 indicator lamp IL1 is flashing with a hold flash indication and thus the executive immediately knows that the waiting call is on line L1. The line L1 pickup switch S1 is thus operated at station #2 to connect the L1 tip and ring conductors to station set 13' and the proper connection to station #2 is thus completed.

If the executive at station #2 does not immediately respond to the signalling device 310, counter IC5 continues to advance from the above-mentioned count of 2 to a count of 4, whereupon IC5 is conditioned to switch output pin 4 to a low logic level. Output junction 340 turns transistor Q3 off and momentarily deenergizes device 310, and applies a low-going logic signal via resistor R28 back to the input pins 2 and 6 of reset timer IC4 of circuit 332. Timer IC4 operates as described in detail above, to apply a rest pulse to input pins 7 and 15 via diodes D10 and D11, resetting both halves of timer IC5 back to zero and the counting cycle commences anew. Thus, so long as station #1 continues to depress the hold select switch S3, transistor switch Q3 of station #2's circuit 300 will be turned on and off with a duty cycle of two seconds on and two seconds off, until station #2 acknowledges the signal by picking up line L1 and removing the hold condition. If station #2 answers the call, the holding signal (at either the 1 or 2 Hz rate) is mashed by the internal impedance of phone set 13' (FIG. 1), causing control unit 14 to terminate the hold condition as described in the above-mentioned U.S. patents. Thus, the termination of the hold condition turns off the interstation signal. If, before station #2 answers the hold line, the hold switch S3 at station #1 is released by the receptionist, the hold signal generator 90 (FIG. 2) reverts to the 1 Hz rate and responsively, discrimination circuit 330 (FIG. 4) resets timer IC3a, which in turn disables counter IC5 and terminates the interstation signal.

The operation of detection and control circuit 300 in conjunction with line L2 is essentially identical to the above-described operation for an interstation signal on line L1. In the case of line L2, timer IC5 responds to reset/enable input pin 15 and count input pin 9 to cause output pin 12 to swing high for the two-cycle on, two-cycle off interval described above for operating signal device 310 via transistor switch Q3.

Alternative Embodiment

An alternative and presently preferred embodiment of the invention is to incorporate circuits 200 and 300 of KTS 11 into large scale integrated (LSI) semiconductor processors that operate, using digitized signals, to perform the various functions that are described above in connection with the embodiment of the invention shown in FIGS. 2-4. More specifically, the control unit for each station is provided with separate LSI processors, one for each of the plurality of telephone lines available at the control unit for performing, in digital fashion, the control and signalling functions carried out by sensing circuits 50 and 60, bell transfer circuit 70, line select circuit 80, exclusion circuits 100 and 100', and interstation signalling circuits 200 and 300 of FIG. 2. Each chip processor (in this instance separate chips are provided for lines L1 and L2) receive input signals from line interface circuits 30 and 40, line pickup switches S1 and S2 and the hold select switch S3, and in response thereto control the L1 and L2 line relays 24 and 26, bell relay 28 and when provided, the interstation signalling device 310.

Figure 5:
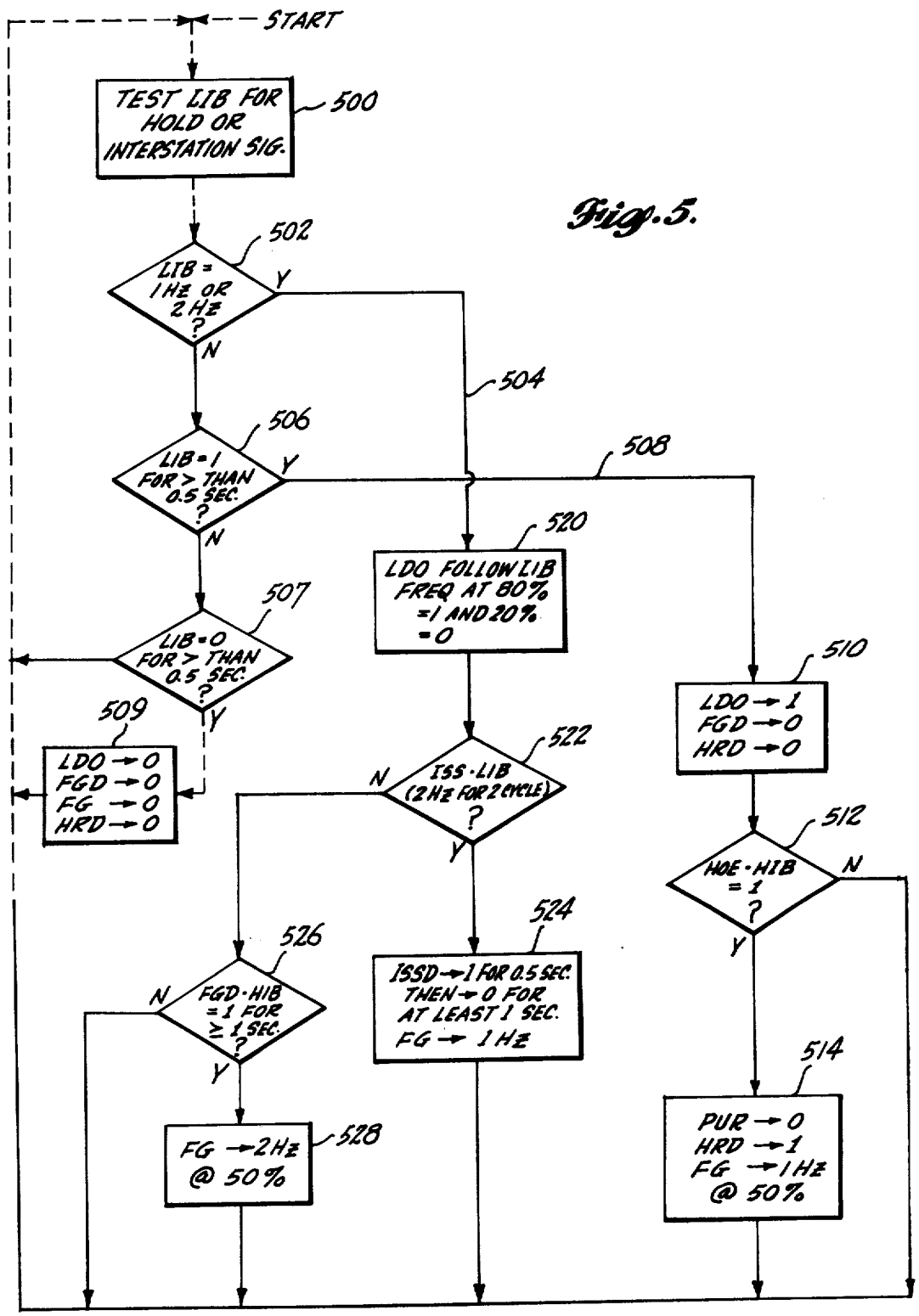
FIG. 5 is a portion of a flow diagram of a solid-state integrated circuit processor that constitutes the currently preferred embodiment of the invention.

For the purpose of disclosing this embodiment of the present invention, reference is made to FIG. 5 which shows a flow chart of the logic and operation for that portion of one of these LSI chip processors which carries out the interstation signal-generating, detecting and controlling functions for one line. Thus, for a two-line KTS as depicted in FIG. 1, control unit 14 will incorporate in addition to the various line relays 24 and 26, bell transfer relay 28 and interface circuits 30 and 40, a first LSI chip processor for line L1 and a second LSI chip processor for line L2. The flow chart in FIG. 5 pertains to just one of these processors. Also, it will be understood that the flow chart in FIG. 5 shows just that portion of the logic and operation of one of these processor for carrying out the interstation signalling functions. The remaining algorithms for each processor have been omitted for clarity and simplification of the present disclosure, and it will be understood that such algorithms in general parallel the operating sequences and conditions heretofore fully disclosed in the above-mentioned U.S. patents and in copending application Ser. No. 007,202.

The abbreviations used in the flow chart of FIG. 5 and the definitions thereof are as follows:

LIB = line interface buss (represents condition of associated telephone line L1 or L2)

HIB = hold input from botton-operated hold switch

FGD = flash generator driver (drives the hold signal flash generator)

FG = flash generator (corresponds to the hold signal flash generator 90 and the associated altering circuit 204 depicted in FIG. 2)

LDO = lamp driver output (represents the operating state of the associated line condition indicating lamp IL1 or IL2)

HOE = hold enable

H = hold condition

HRD = hold relay driver

ISS = interstation signal enable (representing condition by which the associated telephone line for that particular control unit processor has been programmed for detecting an interstation signal)

ISSD = interstation signal driver (drives interstation signalling device 310)

The algorithm for each LSI chip processor commences at START at the top of FIG. 5 and passes downwardly along a dotted line, representing omitted functions not pertinent to the present invention, to an initial instruction block 500. At block 500, the LSI processor is instructed that it will be testing for certain operating conditions, namely Hold or Interstation Signalling, on the LIB. The actual testing for Hold or Interstation Signalling is carried out in a decision block 502 which determines whether LIB=1 Hz or 2 Hz, representing either a standard hold condition at the lower flash rate or a combined hold and interstation signalling condition at the altered and higher flash rate. If LIB is fluctuating at either 1 Hz or 2 Hz, the decision is (Yes) and the algorithm flows out over path 504 to a subloop sequence of decision and instruction blocks which, as described more fully below, carry out the interstation signalling operations.

If the decision at block 502 is (No) the algorithm flow passes downwardly to another decision block 506 which determines whether LIB is at steady 1 for 0.5 seconds or more. In other words, block 506 determines whether the associated telephone line is in a steady off-hook condition and not in a fluctuating hold condition. If (No), the algorithm flows downwardly through a series of additional operations, again omitted for clarity as represented by the dotted line and then returns to START. If LIB has equaled 1 for more than the 0.5 second test period, a (Yes) answer is obtained representing an off-hook busy condition and the flow proceeds to the right of block 506 over path 508 to a subloop that serves to initiate and terminate a hold condition.

From a (No) decision at block 506, the flow proceeds to still another decision block 507 that determines whether the line has gone back on-hook, by testing for LIB=0 for than 0.5 seconds. If (No) the flow path returns to the start of the main loop. If (Yes) the flow goes to instruction block 509 that sets LDO to zero, and ensures that FGD, FG and HRD have been turned off by setting these functions to zero.

The hold control subloop reached over path 508 includes an instruction block 510 that causes LDO to be set at 1 thereby turning on the associated line condition lamp, sets FGD to zero turning off the flash generator driver if it was on and hence turning off the flash generator output signal, and sets HRD to zero thereby deenergizing the hold relay if it was energized. Thus, instruction block 510 places the associated line in a steady, busy condition with the line indicator lamp illuminated in a steady state, and deactivates the hold signal generator and associated hold control circuitry.

From block 510, the algorithm proceeds to a decision block 512 which tests for HOE and HIB=1. When the hold enable represented by HOE and the hold selector button represented by HIB are both on and thus equal to 1, block 512 produces a (Yes) output and the algorithm proceeds downwardly to instruction block 514. The (Yes) output decision from block 512 represents the initiation of a hold condition at the associated line and control unit, and responsively block 514 sets the associated pickup relay to zero, disconnecting the corresponding station set from the line, sets HRD to 1 thereby energizing the hold relay, and sets the flash generator to produce a 1 Hz hold condition signal at a 50% duty cycle. If either or both HOE and HIB are zero, then a (No) decision is produced by block 512 and the algorithm passes downwardly to the bottom of the main loop from which it returns upwardly to the starting point.

Now, reference is made to the interstation signal-generating, detecting and controlling subloop reached over path 504 following a (Yes) decision from block 502. To reach path 504, it has been determined that the line interface buss LIB is alternating on and off at either a 1 Hz or 2 Hz rate. Thus, the associated line could either be in a standard hold condition, or in a combined hold and interstation signalling condition. First, the subloop includes an instruction block 520 which instructs LDO to follow the switching frequency of LIB at 80%=1 and 20%=0. This merely causes the line condition indicator lamp to be operated at a flash rate equaling the frequency at which LIB is alternating high and low, but establishing a duty cycle of 80% on and 20% off for the lamp to conform to the conventional flashing sequence for such lamps.

Next, the algorithm passes to a decision block 522 which tests for the combined conditions of ISS=1 and LIB swinging high and low at a 2 Hz rate for two cycles. ISS will equal 1 when the associated chip has been programmed to provide for the detection of an interstation signal in a manner similar to above-described set-up conditions for control unit 14' for station #2 of FIG. 1.

If decision block 522 determines that the interstation signal function is enabled and LIB is switching at 2 Hz for 2 cycles, a (Yes) output directs the flow to a decision block 524 which serves to energize the interstation signalling device for a brief period and then reset the hold signal flash generator to the normal 1 Hz rate. In particular, block 524 sets ISSD to one for 0.5 seconds and then to zero for at least one second. FG is set to 1 Hz. It is observed that the one second interval of zero for ISSD provides an adequate time for the person at the station which originated the interstation signal to release the hold button before ISSD is again set to one. If the hold button is held depressed, the flow continues to circulate in the loop and when the one second off interval for ISSD has lapsed, it will again be set to one for 0.05 seconds. Thus, as long as the interstation signal continues to be generated at the 2 Hz rate by maintaining the hold select button depressed as described below, block 524 will repetitively energize the interstation signalling device with a duty cycle of one-half second on and one second off. Following block 524, the algorithm returns to the start of the main loop.

A (No) decision from block 522 means either that the chip has not been set up for interstation signalling (i.e., ISS=0) or LIB is alternating at the 1 Hz rate rather than the 2 Hz rate. In either case, the (No) decision routes the algorithm to a decision block 526 which tests for the concurrence of the flash generator driver being on (FGD=1) and the hold select switch being operated HIB=1 for an interval of one second or more. In other words, block 526 determines whether the flash generator of the associated control unit is running, thus establishing that the hold condition was initiated at the subject station, and whether the hold select switch for the same station has been depressed for more than the one second delay interval required to generate the interstation signal. If these conditions are present, block 526 produces a (Yes) response which directs the flow to instruction block 528. Upon reaching block 528, the flash generator is set at a 2 Hz rate with a 50% on/off duty cycle, thus representing the altered hold control signal for interstation signalling.

A (No) response from decision block 526 returns the algorithm to the start of the main loop and indicates one of the following: LIB is not alternating at the 2 Hz rate; interstation signalling is not provided for in the subject processor chip; the flash generator is not running at the subject station and thus some other station must have initiated the hold condition; or the hold select switch has not been depressed for the required one second interval.

While only particular embodiments of the invention have been disclosed herein, it will be readily apparent to persons skilled in the art that numerous changes and modifications can be made thereto without departing from the spirit of the invention.

The embodiments of the invention in which an exclusive property or privilege is claimed are defined as follows:

1. In a key telephone system of the type having a plurality of control units, one for each of a plurality of phone stations, for selectively connecting at least first and second telephone lines to a phone set at each such station, and in which each control unit is of the type having first and second line condition sensing means and associated indicator means for sensing and indicating conditions of on-hook, off-hook and hold on each of the first and second telephone lines, and having first and second hold control means including a hold signal generator for selectively applying a hold control signal to said first and second lines, respectively, in response to a manually operable hold select switch to thereby establish a hold condition on either or both of the lines during which hold condition the associated line is disconnected from the telephone set, the improvement comprising:
    interstation signalling means associated with a first of said control units for altering the hold control signal generated by said first control unit so as to apply an altered hold control signal to one of said lines at a first of the phone stations;
    interstation signal detection means associated with a second of said control units for detecting said altered hold control signal at a second of the phone stations; and
    interstation signalling device means disposed at the second station and being responsive to said detection means for indicating at the second station that said altered hold control signal has been received by said second control unit.

2. The improvement set forth in claim 1, wherein said first and second hold control means include circuit means for applying a holding impedance across the associated line and varying such holding impedance as a function of said hold control signal that is produced by said hold signal generator, and wherein said interstation signalling means comprises circuit means connected to said hold signal generator for causing said hold signal generator to produce said altered hold control signal.

3. The improvement set forth in claim 1, wherein said hold signal generator produces a fluctuating signal having a first predetermined frequency, and wherein said interstation signalling means comprises means for altering said hold signal generator so as to produce a signal that fluctuates at a second predetermined frequency.

4. The improvement set forth in claim 1, wherein said interstation signalling means comprises means responsive to a predetermined sequence of operation of said hold select switch.

5. The improvement set forth in claim 1, wherein said interstation signalling means comprises delay means that is responsive to continuous operation of said hold select switch for a predetermined time interval, and circuit means responsive to said delay means for altering said hold control signal.

6. The improvement set forth in claim 3, wherein said hold signal generator comprises a free-running multivibrator circuit having a resistive-capacitive network that determines the frequency of the hold control signal, and wherein said means of said interstation signalling means for altering said hold signal generator comprises circuit means for changing said resistive-capacitive network.

7. The improvement set forth in claim 1, wherein said interstation signal detection means comprises circuit means for discriminating between said hold control signal and said altered hold control signal.

8. The improvement set forth in claim 1, wherein said interstation signal detection means comprises an electrically controlled switching means having an off state and an on state, said switching means being normally off and being turned on in response to detection of said altered hold control signal, and wherein said interstation signalling device means is energized in response to the on state of said switching means.

9. The improvement set forth in claim 8, wherein said interstation signalling device means comprises an audible signalling device.

10. In a telephone hold control system for selectively generating and applying a hold control signal to a telephone line at a first station, and for receiving such hold control signal on such line at a second station, the improvement in combination therewith comprising:
    interstation signalling means associated with the first station for selectively altering said hold control signal so as to apply an altered hold control signal to the telephone line thereat;
    interstation signal detection means associated with a second station for detecting said altered hold control signal received thereat; and
    interstation signal utilizing means disposed at the second station and being responsive to said detection means.

* * * * *